United States Patent
Hershey et al.

(10) Patent No.: US 9,514,782 B2
(45) Date of Patent: Dec. 6, 2016

(54) METHOD AND SYSTEM FOR ACTIVATION OF AN OPTICAL ARTICLE

(75) Inventors: John Erik Hershey, Ballston Lake, NY (US); Bruce Gordon Barnett, Troy, NY (US); Marc Brian Wisnudel, Clifton Park, NY (US); Richard Louis Frey, Delanson, NY (US); James Enrico Sabatini, Scotia, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 2697 days.

(21) Appl. No.: 12/119,796

(22) Filed: May 13, 2008

(65) Prior Publication Data

US 2009/0316565 A1 Dec. 24, 2009

(51) Int. Cl.
*G06F 21/00* (2013.01)
*G11B 23/28* (2006.01)
*G11B 19/12* (2006.01)
*G11B 20/00* (2006.01)

(52) U.S. Cl.
CPC ........... *G11B 23/281* (2013.01); *G11B 19/122* (2013.01); *G11B 20/0021* (2013.01); *G11B 20/00086* (2013.01); *G11B 20/00137* (2013.01); *G11B 20/00144* (2013.01); *G11B 20/00231* (2013.01);
(Continued)

(58) Field of Classification Search
USPC ..................................... 705/51; 720/718–746
See application file for complete search history.

(56) References Cited

U.S. PATENT DOCUMENTS

| 4,374,001 A | 2/1983 | Bernier |
| 4,444,626 A | 4/1984 | Bernier et al. |
| 4,918,317 A | 4/1990 | Hess et al. |

(Continued)

FOREIGN PATENT DOCUMENTS

| WO | 98/40930 A1 | 9/1998 |
| WO | 2004/095447 A1 | 11/2004 |

OTHER PUBLICATIONS

White, Ron, "How Computers Work", Millennium Ed., Que Corporation, Indianapolis, IN, 1999.*

(Continued)

*Primary Examiner* — Chrystina Zelaskiewicz
(74) *Attorney, Agent, or Firm* — Fletcher Yoder, P.C.

(57) ABSTRACT

A method for activating an optical article includes providing an optical article, wherein at least one mark is disposed on the optical article, wherein the mark comprises an optical-state change material in an initial state, the initial state preventing the optical article from being read by a player; deriving an unlock code by cryptographic operations on an optical article operatively coupled with a POS equipment and a data input from a medium encrypted with a cryptographic algorithm; deriving a toggling signal from an unlock code, and applying the toggling signal to the at least one mark resulting in changing the optical-state change material to a final state, the final state allowing the optical article to be read by the player; wherein the toggling signal comprises a set of values corresponding to the respective states of each of a plurality of marks on the surface of the optical article, and wherein applying the toggling signal results in setting each of the marks to either one of an initial state or a final state, corresponding to the value for the mark in the toggling signal.

27 Claims, 3 Drawing Sheets

(52) U.S. Cl.
CPC ... *G11B 20/00413* (2013.01); *G11B 20/00586* (2013.01); *G11B 2220/2562* (2013.01)

(56) References Cited

U.S. PATENT DOCUMENTS

| | | | |
|---|---|---|---|
| 5,141,622 A | 8/1992 | Fauteux et al. | |
| 5,451,932 A | 9/1995 | Wunderlich et al. | |
| 5,491,262 A | 2/1996 | Hung | |
| 5,559,983 A | 9/1996 | Masood | |
| 5,699,047 A | 12/1997 | Tsai et al. | |
| 5,761,301 A * | 6/1998 | Oshima | G06F 21/80 235/494 |
| 5,815,484 A | 9/1998 | Smith et al. | |
| 5,963,536 A | 10/1999 | Vasic et al. | |
| 6,633,853 B2 | 10/2003 | Oshima et al. | |
| 6,790,501 B2 | 9/2004 | van de Grampel et al. | |
| 6,795,464 B2 | 9/2004 | Lawandy | |
| 6,902,111 B2 | 6/2005 | Han et al. | |
| 6,990,671 B1 | 1/2006 | Evans et al. | |
| 7,127,066 B2 | 10/2006 | Solomon et al. | |
| 7,315,946 B1 | 1/2008 | Blumenfeld et al. | |
| 7,444,296 B1 | 10/2008 | Barber et al. | |
| 7,653,919 B2 | 1/2010 | Potyrailo et al. | |
| 2002/0163479 A1 | 11/2002 | Lin et al. | |
| 2004/0022542 A1 | 2/2004 | Atkinson | |
| 2004/0054594 A1 | 3/2004 | Forster et al. | |
| 2004/0120236 A1 | 6/2004 | Suzuki et al. | |
| 2005/0110978 A1 | 5/2005 | Potyrailo et al. | |
| 2005/0167510 A1 | 8/2005 | Potyrailo et al. | |
| 2006/0002269 A1 | 1/2006 | Bourget et al. | |
| 2006/0028924 A1 * | 2/2006 | Atkinson | G07C 9/00103 369/13.01 |
| 2006/0100983 A1 * | 5/2006 | Atkinson | G06F 21/88 |
| 2006/0114755 A1 | 6/2006 | Eklund | |
| 2006/0132309 A1 | 6/2006 | Posamentier | |
| 2006/0159266 A1 * | 7/2006 | Chavanne et al. | 380/262 |
| 2006/0177768 A1 * | 8/2006 | Tauchi et al. | 430/270.13 |
| 2006/0227696 A1 | 10/2006 | Smith et al. | |
| 2006/0234003 A1 | 10/2006 | Selinfreund | |
| 2007/0024948 A1 | 2/2007 | Hirano et al. | |
| 2007/0070867 A1 | 3/2007 | Forster et al. | |
| 2007/0115762 A1 | 5/2007 | Wisnudel et al. | |
| 2007/0116920 A1 | 5/2007 | Krishnan et al. | |
| 2007/0116988 A1 | 5/2007 | Wisnudel et al. | |
| 2007/0143774 A1 | 6/2007 | Agrawal et al. | |
| 2007/0201502 A1 | 8/2007 | Abramson | |
| 2009/0249381 A1 | 10/2009 | White et al. | |
| 2009/0285074 A1 | 11/2009 | Wisnudel et al. | |
| 2009/0285075 A1 | 11/2009 | Wisnudel et al. | |

OTHER PUBLICATIONS

Taylor, J., Johnson, M., Crawford, C.G., "DVD Demystified", 3rd Ed., McGraw-Hill; 2006, Chapter 7-1 to 7-30 and Chapter 9-1 to 9-33. (65 pages).

Labarge, R., "DVD Authoring and Production", CMP Books; 2001, pp. 30-37, 198-221, 452-453. (36 pages).

* cited by examiner

METHOD AND SYSTEM FOR ACTIVATION OF AN OPTICAL ARTICLE

BACKGROUND

The invention relates generally to an optical article for playback in a player. More particularly the invention relates to an activation method and a system for rendering an optical article playable in a player.

Shoplifting is a major problem for retail venues and especially for shopping malls, where it is relatively difficult to keep an eye on each customer while they shop or move around in the store. Relatively small objects, such as CDs and DVDs are common targets as they can be easily hidden and carried out of the shops without being noticed. Shops, as well as the entertainment industry, incur monetary losses because of such instances.

Even though closed-circuit surveillance cameras may be located at such places, theft still occurs. Consumer products sometimes are equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are unappealing because they add an additional inconvenience to the buyer or retailer, or they are not as effective at preventing theft as desired. Optical storage media, in particular, pose an additional problem in that their packaging and the sensor or anti-theft tags may be easily removed.

RFID tags have also been employed to trace the items on store shelves and warehouses. The tags are physically attached to the DVD and may comprise an element with nonlinear impedance, resonating circuit, and antenna connected to the package housing the DVD. When such a tag is illuminated by a properly tuned RF signal, the tag will generate and radiate a detectable harmonic of the illuminating signal. This radiation may be detected and used to trigger an alarm. Using this approach, a potential shoplifter may set off an alarm if the DVD package is carried through an exit under such RF illumination. However, this method can be overcome by encasing the DVD package with a tag in an electrically conducting wrapper or bag. It is also possible that the person who has wrongfully obtained the DVD may remove the DVD through an unauthorized or unmonitored exit point from the shop.

It is also becoming increasingly common to see identity theft that may encompass not just strictly personal use identification-related material but also corporate documents such as badges, PINS, and other employee-associated items. Concomitantly thefts of security system components themselves are also being witnessed. They are ripped and removed from their disposition in the security system host. Identity theft may result in huge potential losses incurred by vesting too much control or access in one security-related item alone.

Accordingly, there remains a need for an improved solution to this long-standing problem. The method and system described herein fills this need by providing an activation system and employing an activation method that will hinder activation of a protected DVD by an unauthorized user.

BRIEF DESCRIPTION

One embodiment of the present disclosure is directed to a method for activating an optical article. The method includes providing an optical article, wherein at least one mark is disposed on the optical article, wherein the mark comprises an optical-state change material in an initial state, the initial state preventing the optical article from being read by a player; deriving an unlock code by cryptographic operations on an optical article operatively coupled with a POS equipment and a data input from a medium encrypted with a cryptographic algorithm; deriving a toggling signal from an unlock code, and applying the toggling signal to the at least one mark resulting in changing the optical-state change material to a final state, the final state allowing the optical article to be read by the player; wherein the toggling signal comprises a set of values corresponding to the respective states of each of a plurality of marks on the surface of the optical article, and wherein applying the toggling signal results in setting each of the marks to either one of an initial state or a final state, corresponding to the value for the mark in the toggling signal.

Another embodiment of the present disclosure is directed to a system for activating an optical article. The system includes an optical article, wherein at least one mark is disposed on the optical article, wherein the mark comprises an optical-state change material in an initial state, the initial state preventing the optical article from being read by a player; a means for deriving an unlock code by cryptographic operations on an optical article operatively coupled with a POS equipment and a data input from a medium encrypted with a cryptographic algorithm; a means for deriving a toggling signal from the unlock code; and a means for applying the toggling signal to the at least one mark resulting in changing the optical-state change material to a final state, the final state allowing the optical article to be read by a player; wherein the toggling signal comprises a set of values corresponding to the respective states of each of a plurality of marks on the surface of the optical article, and wherein applying the toggling signal results in setting each of the marks to either one of an initial state or a final state, corresponding to the value for the mark in the toggling signal.

Figure 1:
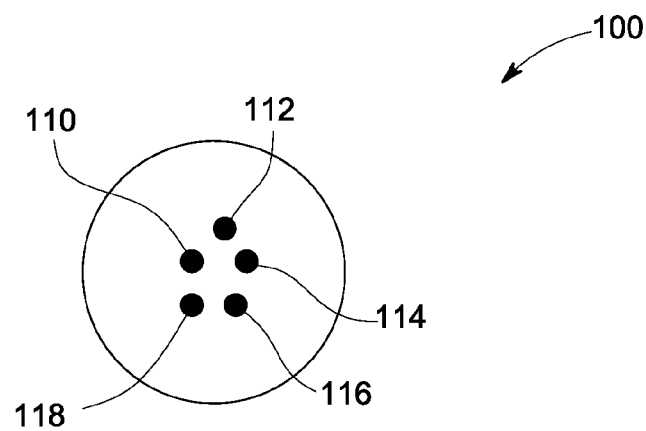
FIG. 1 shows an optical article configured in accordance with an embodiment described herein.

These and other features, aspects, and advantages of the present invention will become better understood when the following detailed description is read with reference to the accompanying drawings in which like characters represent like parts throughout the drawings, wherein:

DETAILED DESCRIPTION

The invention relates generally to an optical article for playback in a player. More particularly the invention relates to a method for activating an optical article.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise.

One solution to the shoplifting problem, specifically for optical media articles such as DVD's, is to render at least a portion of the content of the DVD inaccessible unless the retailer at the point-of-sale (POS) has activated the DVD. One approach to rendering the content of the DVD inaccessible prior to activation is to employ an ink composition, to deposit a coating composition comprising an optical state change material in or on the DVD, wherein the coating composition at least partially absorbs the incident laser light from an optical data reader so that the complete data directly in the optical path of the laser light cannot be read. The coating composition may be deposited in the form of marks over data or command containing regions on the optical article. In this instance, the optical article has only nominal value, and therefore there is no incentive for the shoplifter to steal it. However, upon converting the DVD to a "playable" state using an external stimulus at the point-of-sale, the coating composition becomes sufficiently transparent, with respect to the wavelength of the laser light employed in the optical data reader, due to a change in the optical properties of the coating composition, and the complete data directly in the optical path of the laser light can now be read by the incident laser light from the optical data reader, therefore rendering the full content of the DVD accessible to an authorized user.

Various methods may be employed for using an external stimulus to convert the DVD to a playable state. One approach is to render the DVD unplayable until a set of toggling signals have been applied to a set of toggle marks disposed on the DVD. The marks may be opaque or transparent to a reading laser of a DVD reader. Upon application of a toggling signal an opaque mark may turn transparent and a transparent mark may turn opaque, and therefore render the DVD playable by a authorized user. In other embodiments, control logics and commands may be authored on the DVD and used to render the DVD playable or unplayable in combination with the state of the marks.

As used herein, the term "disposed over" or "deposited over" or "disposed between" refers to both disposed directly in contact with and indirectly by having intervening layers therebetween. "Operably coupled" is a relationship between listed parts that provide a stated function.

As used herein, the term "unplayable" state refers to a state of the optical article where the mark has not yet been exposed to one or more external stimuli, while the term "playable" state refers to a state where the mark has been exposed to the correct toggling signal. In one embodiment, the unplayable state comprises at least one mark which inhibits portions of the optical data layer that are located directly in the optical path of the incident laser light of an optical data reader from being read. In another embodiment, the unplayable state comprises at least one mark that allows portions of the optical data layer that are located directly in the optical path of the incident laser light of a player, to be read. In yet another embodiment, the unplayable state comprises at least one mark that inhibits a portion of the optical data layer located directly in the optical path of the incident laser light of a player from being read, and at least one mark that allows portions of the optical data layer that are located directly in the optical path of the incident laser light of an optical data reader to be read. In all of these embodiments the playable state comprises a state of the optical article, where the optical data layer can be read by the player as a result of the article being exposed to a toggling signal.

As used herein, the term "playable" state, refers to a state of the optical article where the optical data layer can be read by the optical data reader as a result of the optical article having been exposed to an authorized toggling signal. In one embodiment, the optical-state change material is at least partially transparent to the laser from the optical data reader, and does not inhibit the data located directly in the optical path of the laser from being read. In another embodiment, the optical-state change material partially absorbs light from the laser from the optical data reader and prevents the data directly in the optical path of the laser from being read. As used herein the term "opaque" is defined as the state of the optical state change material when it sufficiently absorbs the laser light to cause the data directly in the optical path of the laser from being read. As used herein the term "reflectivity" is defined as the ratio of reflected light to incident light.

As used herein, the term "optical article" refers to an article that includes an optical data layer for storing data. The stored data may be read by, for example, an incident laser of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage. In one embodiment, the first surface of the optical article comprises a polycarbonate. In one embodiment, the placing a plurality of optically detectable marks is carried out on a first surface of the optical article.

One embodiment of the present disclosure is directed to a method for activating an optical article. The method includes providing an optical article, wherein at least one mark is disposed on the optical article, wherein the mark comprises an optical-state change material in an initial state, the initial state preventing the optical article from being read by a player; deriving an unlock code by cryptographic operations on an optical article operatively coupled with a POS equipment and a data input from a medium encrypted with a cryptographic algorithm; deriving a toggling signal from an unlock code, and applying the toggling signal to the at least one mark resulting in changing the optical-state change material to a final state, the final state allowing the optical article to be read by the player; wherein the toggling signal comprises a set of values corresponding to the respective states of each of a plurality of marks on the surface of the optical article, and wherein applying the toggling signal results in setting each of the marks to either one of an initial state or a final state, corresponding to the value for the mark in the toggling signal.

In one embodiment, the method includes providing an optical article, operatively coupled with a POS (point-of-sale) equipment comprising or in communication with a cryptographic module, wherein one or more marks, each mark comprising an optical state-change material, are disposed on the surface of the optical article. The optical state-change material may be toggled to either an initial state or a final state. The initial state is transparent and allows the portion of the optical article covered by a mark in the initial state to be read by the optical article reader; the final state is opaque to the optical article reader and disallows reading of the portion of the optical article covered by a mark in the final state. An authorized user may be permitted to use the cryptographic module to produce an unlock code and apply the produced unlock code, as a signal, to individually toggle or not toggle the individual marks of the one or more marks so that the one or more marks are each in their proper states in order that the optical article may be properly read by the optical article reader. The process of individually toggling or not toggling the individual marks of the one or more marks so that they are in their proper states is termed "detoggling" and the signal used for detoggling is termed the detoggling signal. In one embodiment, before the detoggling signal is applied, a mark is said to be in its initial state; after the detoggling signal is applied, a mark is said to be its the final state.

In another embodiment, the optical article's surface contains an area comprising a control logic, which if read by the player, will result in the DVD being rendered to the unplayable state. In this embodiment at least one mark is deposited on the optical article's surface above this control logic. The correct toggling signal for rendering the DVD playable will need to set the at least one mark to the final state so that the control logic beneath will not be read. In yet another embodiment, the optical article's surface contains a control logic that must be read for the DVD to be in the playable state and a control logic that must not be read for the DVD to be in the playable state. These two control logics are beneath separate marks. For this embodiment, the toggling signal must be such that the marks covering these control logics are in the proper states to inhibit and promote reading of the control logics below them according to whether the control logics below them will inhibit reading or promote reading both conditions simultaneously required for the DVD to be in the playable state.

In one embodiment, a DVD is unplayable until a set of toggling signals have been applied to a set of toggle marks, wherein each of the marks is either opaque or transparent with respect to a reader laser of a DVD player. In one embodiment, the toggle marks are marks comprising an optical-state change material. In one embodiment, the activation of the DVD is configured in a manner such that an opaque toggle mark may turn transparent upon application of a toggling signal and a transparent toggle mark will turn opaque. The DVD may be rendered playable only when all the marks are transparent. For example, to render the DVD playable, it is necessary to properly toggle only the originally opaque marks. Thus it may become necessary to know the location of the opaque toggle marks on the DVD in order to generate the unlock code and thereby render the DVD playable. This information may be derivable using a combination of identification symbols selected from one or more of a DVD package identifier that is applied to the DVD or its housing, information stored on a store clerk's identification document, and other data elements including a set of cryptographic keying variables. The toggling signal may be derived from a POS equipment i.e., a DVD detoggler which may be configured to provide a direct or an indirect activation signal as known to one skilled in the art. Similarly, another embodiment requires that a portion of the marks be opaque and the remainder be transparent. In this embodiment, toggling of the originally opaque marks is required if those marks must be made transparent, toggling of the originally transparent marks is required if those marks must be made opaque, and no toggling is required of any other marks.

In one embodiment, the method further comprises providing a protective layer on the surface of the optical article; wherein the optical article is rendered playable if the protective cover is removed after applying the toggling signal; and wherein the optical article is rendered unplayable if the protective cover is removed before applying the toggling signal.

In one embodiment, the optical-state change material in the initial state is opaque and the optical-state change material in the final state is transparent to the laser used by the player to read the optical article. In another embodiment, the optical-state change material in the initial state is transparent and the optical-state change material in the final state is opaque to the laser used by the player to read the optical article.

In one embodiment, the mark of a plurality of optically detectable marks includes an optical-state change material comprising a dye or a reactive material. As used herein the term "optical-state change" material is used to describe a material which is capable of existing in at least two different forms, each form possessing a unique optical state, for example a unique wavelength associated with a maximum optical absorbance within a range from about 200 nm to about 800 nm, or a unique extinction coefficient at a specific wavelength between about 200 nm to about 800 nm. Non-limiting examples of optical-state change materials include halochromic optical-state change materials, light-sensitive materials including photo-bleachable materials, polymeric materials, organic compounds, hydrogels, liquid crystalline materials, leuco dyes, inorganic compounds such as, but not limited to, metal oxides and organometallic compounds, materials capable of undergoing a sigmatropic bond rearrangement, and reactive adduct materials. In various embodiments, the optical-state change materials may undergo the optical-state change under the influence of a thermal stimulus i.e., may be thermally-sensitive or thermochromic or an electrical stimulus i.e., may be electrochromic. The term "thermochromic" as used herein, describes materials that undergo either a reversible or an irreversible thermally induced change in color or opacity. The term "electrochromic" as used herein, describes materials that undergo either a reversible or an irreversible electrically induced color change.

One suitable halochromic optical-state change material that may be used in the mark is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the mark may contain a dye i.e., a pH responsive dye such as for example a triaryl methylene dye. One example of a triaryl methylene dye is the sodium salt of bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the mark. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

As used herein, the term "chromic dye" describes optical-state change dyes which can exist in two different color forms between about 200 nm to about 800 nm. In one embodiment, the chromic dye is a triarylmethylene dye. Suitable non-limiting examples of triarylmethylene dyes include bromocresol green, bromothymol blue, bromocresol purple, and corresponding salts thereof.

Non-limiting examples of dyes that can be used include bromocresol green, bromocresol purple, bromophenol blue, bromothymol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, patent blue V, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine. Non-limiting examples of photo-bleachable materials may include dye compounds selected from xanthenes, thiazines, oxazines, triarylmethines, lactones, cyanines, fulgides, spiropyrans, and diarylethenes. Examples of dye compounds can include, but are not limited to, methylene blue, toluidine blue, Rose Bengal, erythrosine B, eosin Y, and fluorine dyes.

In one embodiment, the medium encrypted with the cryptographic algorithm may be one or more of a store key, a clerk key table, a data from a clerk's badge, and an optical article package identifier. In one embodiment, the cryptographic operations are according to one of the encryption standards selected from the group consisting of an advanced encryption standard (AES) and a public-key cryptography standard. In one embodiment, the advanced encryption standard (AES) is operated in the electronic code book (ECB) mode. ECB operates like a "code book", where every block of "plain text" maps to exactly one block of "cipher text".

In one embodiment, the detoggling signal is computed as a function of an optical article package identifier. In one embodiment, the package identifier is stored in the electrical device. In one embodiment, the package identifier on the medium is one or more of a printed set of symbols, a magnetically readable strip, an optically readable bar code, and an RFID device.

In one embodiment, the optical article comprises at least one first control logic comprising at least one sector; wherein each optically detectable mark in the initial state is associated with a particular first control logic; wherein the first control logic includes a command to prevent the optical article from being ready by the player; and wherein each first control logic is executed only when its associated optically-detectable mark is in a pre-determined state. For example, if the mark in the initial state is transparent to the laser of the DVD, the first control logic on the DVD may be read, and the command will direct the player to disrupt the successful reading of the DVD. In another embodiment, by disposing one or more marks over the first control logic, the potential user may also ensure that these marks may be opaque to the laser of the DVD, i.e., each mark is in a state that does not permit the first control logic to be read by the player, in order to render the DVD to a playable state. In yet another embodiment, marks may be disposed over areas of the DVD that need to be read to ensure successful operation and marks may also be disposed over areas of the DVD that must not be read to ensure successful operation, and a combination of the state of the marks will render the DVD to a playable state.

In one embodiment, the unlock code is derived within a secure environment. In one embodiment, the initial state i.e., the pre-activated state or the unplayable state is characterized by an optical reflectivity of at least one portion of the optical article having a reflectivity of less than about 20 percent based on the reflectivity of the at least one portion of the optical article in the final state i.e., the activated state or the playable state.

It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

In various embodiments, the mark may be deposited in a discrete area on the optical article, such that at least one mark, at least one line, at least one radial arc, at least one patch, a continuous layer, or a patterned layer extends across at least a portion of the optical article. One or more marks may be deposited on the optical article in various forms, such as a discrete portion, a continuous film, or a patterned film. During activation, the mark may be stimulated in a continuous, discontinuous or pulsed form.

Alternatively, instead of being deposited on the surface of the optical article, the mark may be deposited inside the structure of the optical article. In optical storage articles, the mark may be deposited in the substrate on which the optical data layer is deposited. In alternate embodiments, the mark may be deposited between the layers of the optical article, or may be deposited within a layer of the optical article. For example, the ink composition may be incorporated in the UV curable adhesive of the bonding (spacer) layer. In this case it should be appreciated that these marks should be thermally stable to withstand the manufacturing temperatures of the optical article. Also, these marks may preferably absorb the wavelength of the laser light in one of the playable, or the unplayable state of the optical article. Upon interaction with external stimulus, the mark present inside the substrate changes color. As a result, the substrate may become transparent to the laser light, thereby facilitating the transmittance of laser light through the substrate and making the optical article readable.

Another embodiment of the present disclosure is directed to a system for activating an optical article. The system includes an optical article, wherein at least one mark is disposed on the optical article, wherein the mark comprises an optical-state change material in an initial state, the initial state preventing the optical article from being read by a player; a means for deriving an unlock code by cryptographic operations on an optical article operatively coupled with a POS equipment and a data input from a medium encrypted with a cryptographic algorithm; a means for deriving a toggling signal from the unlock code; and a means for applying the toggling signal to the at least one mark resulting in changing the optical-state change material to a final state, the final state allowing the optical article to be read by a player; wherein the toggling signal comprises a set of values corresponding to the respective states of each of a plurality of marks on the surface of the optical article, and wherein applying the toggling signal results in setting each of the marks to either one of an initial state or a final state, corresponding to the value for the mark in the toggling signal.

In one embodiment, the system includes providing an optical article, operatively coupled with a POS equipment comprising or in communication with a cryptographic module, wherein one or more marks, each mark comprising an optical state-change material, are disposed on the surface of the optical article. The optical state-change material may be toggled to either an initial state or a final state. The initial state is transparent and allows the portion of the optical article covered by a mark in the initial state to be read by the optical article reader; the final state is opaque to the optical article reader and disallows reading of the portion of the optical article covered by a mark in the final state. An authorized user may be permitted to use the cryptographic module to produce an unlock code and apply the produced unlock code, as a signal, to individually toggle or not toggle the individual marks of the one or more marks so that the one or more marks are each in their proper states in order that the optical article may be properly read by the optical article reader. As discussed above, the process of individually toggling or not toggling the individual marks of the one or more marks so that they are in their proper states is termed detoggling and the signal used for detoggling is termed the detoggling signal.

Referring to FIG. 1, a DVD 100 shows a plurality of toggle marks 110, 112, 114, 116, and 118 disposed on the surface of the DVD 110. The marks comprise one or more of an electrochromic material, a light-sensitive material, a thermochromic material, a thermally-responsive material, or a combination thereof. The data in the optical article covered by each toggle mark is such that if any one of the toggle marks is not set properly when the DVD is inserted into a DVD reader, the DVD will not play. The toggle marks that are not set properly must therefore be toggled before playing the DVD. Further, there is a protective layer (not shown in the figure), such as an opaque film, which is disposed over the toggle marks. This film does not allow the condition of any particular toggle mark to be discerned prior to the removal of the protective layer. If the protective cover is removed before the mark is toggled it may no longer be possible to toggle the mark, i.e., the mark remains in a state equal to the state prior to the removal of the protective cover. For example if the mark were opaque before removing the protective layer, the mark remains opaque if the protective layer is removed before toggling the mark.

Figure 2:
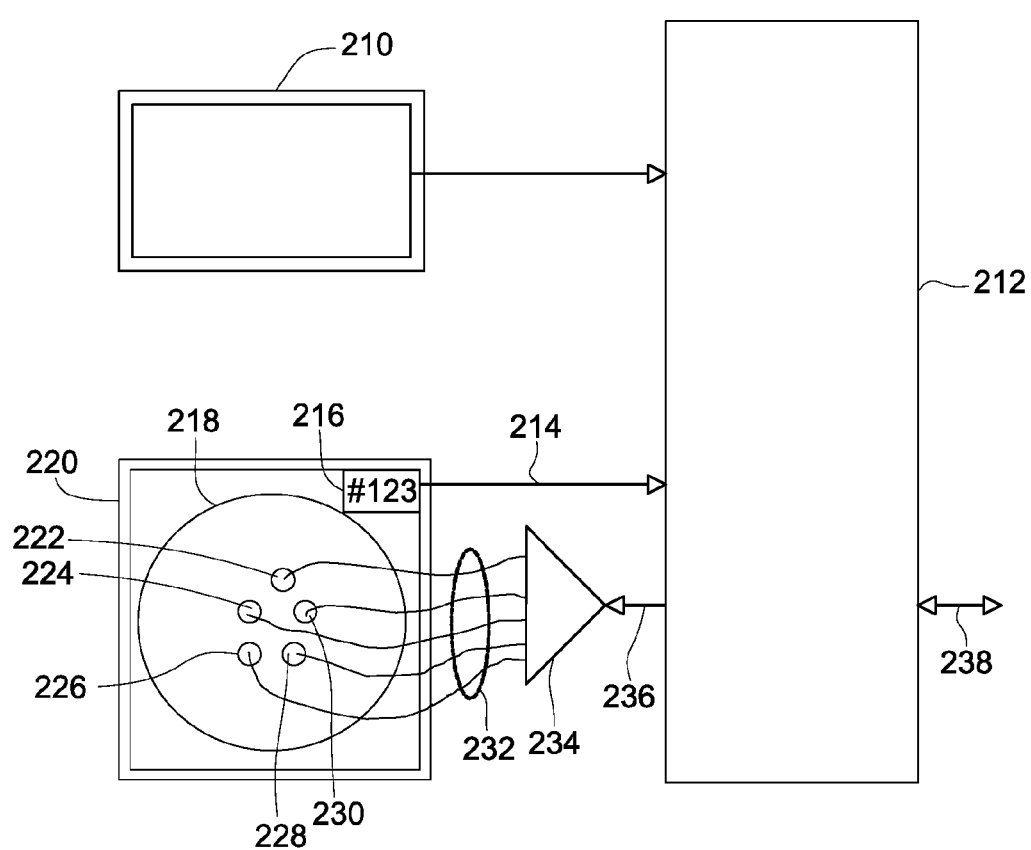
FIG. 2 shows a system configured in accordance with an embodiment described herein.

Referring to FIG. 2, a system 200 shows a layout for correctly toggling the toggle marks of a DVD 218 so that it may be played in a DVD player (not shown in figure) after removal of the protective cover (not shown in figure). The DVD 218 has a series of identification symbols termed the DVD package identifier 216. The DVD package identifier 216 may be imprinted on the DVD 218 or otherwise associated and attached to the DVD package 220 as shown in the figure. A device 212 functions as the DVD detoggler. In order to correctly toggle the toggle marks 222, 224, 226, 228, and 230 on the surface of the DVD 218, the DVD package identifier 216 must be entered into the DVD detoggler 212 via an input port 214. The DVD package identifier 216 may be entered into the DVD detoggler 212 using a variety of methods. One method of entering the DVD package identifier 216 into the DVD detoggler 212 includes manually entering the DVD package identifier 216 by using a variety of devices, such as for example, a keyboard, switches, and a voice recognition facility. Another method of entering the DVD package identifier 216 into the DVD detoggler 212 includes using an optical bar code reader, a magnetic reader, or an RFID device to enter the DVD package identifier 216 into the DVD detoggler 212. Additionally, data from a store clerk's identification document 210, such as a badge, must be input to the DVD detoggler 212. The additional data from a store clerk's identification document may be entered into the DVD detoggler 212 in a similar manner as described above for entering the DVD package identifier 216.

Once the DVD package identifier 216 and data from the clerk's badge 210 have been entered into the DVD detoggler 212, the DVD detoggler 212 derives an output signal termed the unlock code 236. The unlock code is then input to the detoggler interface 234. The detoggler interface 234 then produces and applies, through connectors 232, toggling signals to the toggle marks 222, 224, 226, 228, and 230 on the DVD 218 that toggle only those toggle marks that need to be changed.

The DVD detoggler 212 may also have a bidirectional communication capability 238 that is used to interface the DVD detoggler 212 to a communication network (not shown in figure). The communication network may be used for the purpose of establishing and updating data resident within the DVD detoggler 212, the clerk key table (not shown in figure), and the store key (not shown in figure). The communications network may also be used as a security check, such as for example by giving out an alarm if the DVD detoggler 212 is removed or if the DVD is away form the network for an extended period of time. Once the DVD package identifier 216 is authenticated the DVD detoggler 212 produces the unlock code according to the sequence of steps described in the discussion of FIG. 3.

Figure 3:
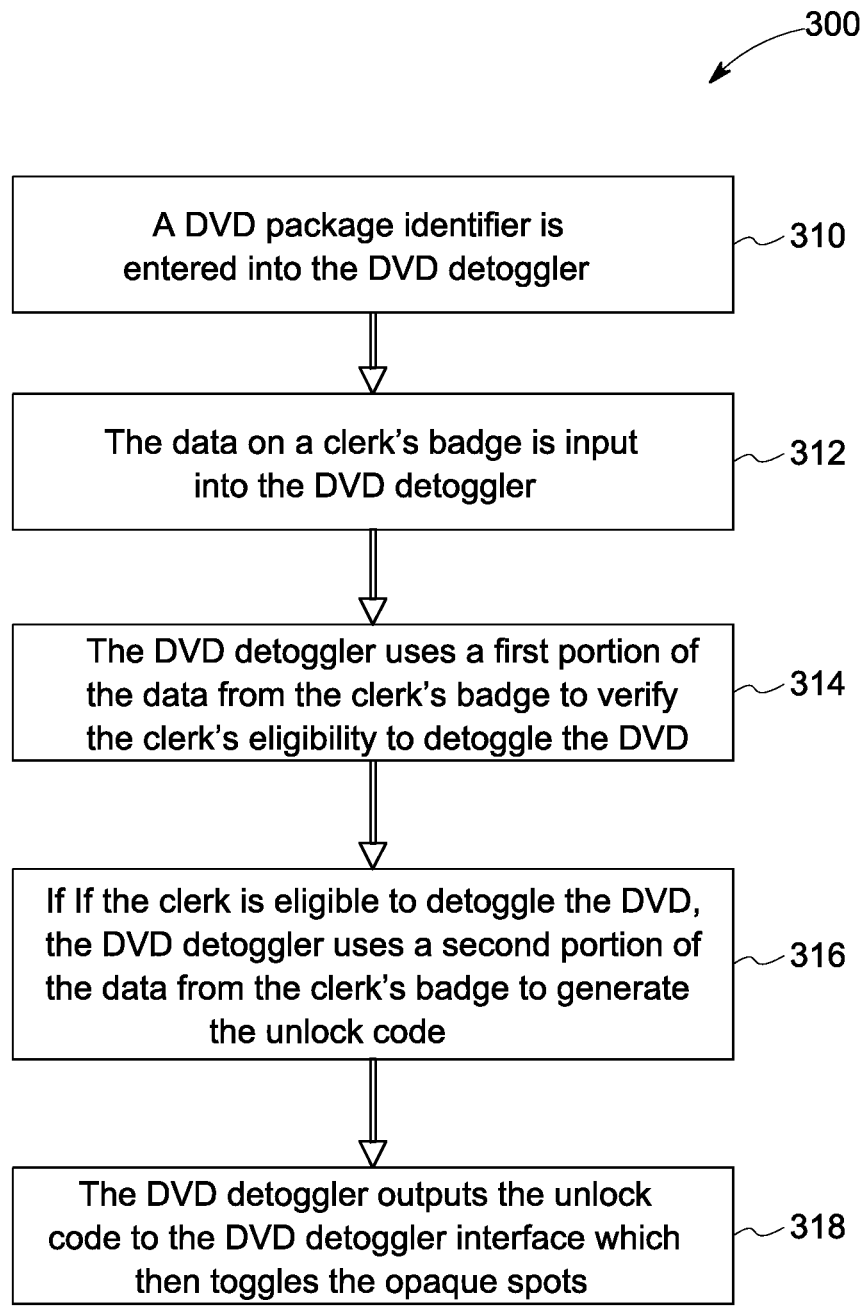
FIG. 3 shows a flowchart for a method in accordance with an embodiment described herein.

Referring to FIG. 3, a step-wise method 300 for producing the unlock code is provided. In a first step 310 a DVD package identifier is entered into the DVD detoggler. This is followed by a second step 312 wherein the data on a clerk's badge is input into the DVD detoggler. This step is followed by a third step 314 wherein the DVD detoggler uses a first portion of the data from the clerk's badge to verify the clerk's eligibility to detoggle the DVD. If the clerk is determined to be authorized to detoggle the toggle marks on the DVD, then the third step is followed by a fourth step 316 wherein the DVD detoggler uses a second portion of data from the clerk's badge to generate the unlock code. The fourth step is followed by the fifth and final step 318 wherein the DVD detoggler generates and outputs the unlock code to the DVD detoggler interface which then toggles the appropriate marks on the DVD. The DVD detoggler interface may be a digital-to-analog converter (DAC) converter, such as for example a lumped parameter circuit, a microcontroller, or an FPGA which can function as a DAC.

Figure 4:
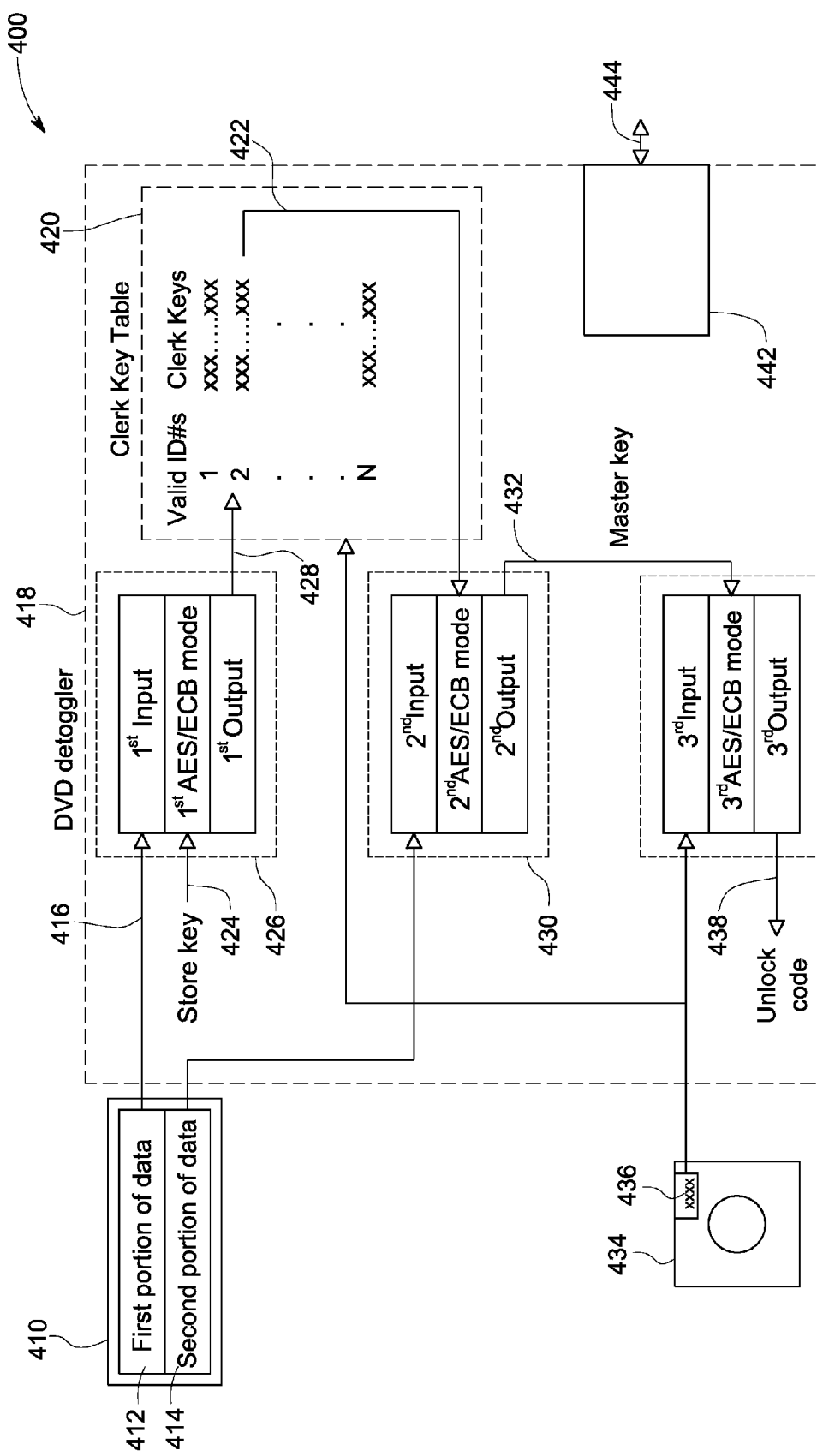
FIG. 4 shows a system configured in accordance with an embodiment described herein.

Referring to FIG. 4, layout 400 of one embodiment of a DVD detoggler 418 is provided. The DVD package identifier 436 in the DVD package 434 serves two purposes. A first portion of the DVD package identifier 436 specifies the correct corresponding clerk key table 420 to be used in an event when there may be a plurality of such tables. A clerk's badge 410 includes a first portion of a data 412 and a second portion of a data 414. The first portion of the data 412 is input 416 to the input register of the Advanced Encryption Standard (AES) operating in the Electronic Code Book (ECB) mode AES/ECB 426, wherein the AES/ECB is set to encrypt. The AES and its ECB mode are well known to one skilled in the art and specified in Federal Information Processing Standard Publication 197 and NIST Special Publication 800-38A respectively. The AES/ECB 426 encrypts the first portion of the data 412 under control of the Store key keying variable 424. The output 428 of the encryption is used to check the validity of the clerk's badge 410 by checking to see that the output 428 is a valid identification number in the clerk key table 420. If the output 428 matches a valid identification number in the clerk key table 420, then the corresponding clerk key 422, also stored in the clerk key table 420, is used as the keying variable for a second AES/ECB encryption 430. The second portion of data 414 of the clerk's badge 410 is used as the input to this second encryption and the output 432 of the encryption is the keying variable to be used in a third AES/ECB encryption 440. The DVD package identifier 436 also has a portion of its data that is used as the input to this third encryption and the output is the unlock code 438 for the DVD (not shown in figure) in the DVD package 434 having DVD package identifier 436. For example, the DVD detoggler 418 may be realized within a secure environment by a properly programmed secure microprocessor such as is available from the Dallas Semiconductor Co., or it may be realized within a secure environment by a Field Programmable Gate Array (FPGA) or a microcontroller enshrouded within a protective encapsulation such as the GORE™ Tamper Respondent Envelope. The DVD detoggler 418 may also have a bidirectional communication capability 444 that is used to interface the DVD detoggler 418 to a communication network 442 as described in FIG. 2 above. Also the first, second and third AES/ECB encryptions 426, 430, and 440, respectively may, for example, be performed by the same piece of hardware or executed software by appropriately arranging and synchronizing intermediate data storage and data transfers as is well known in the computer engineering art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for activating an optical article comprising:
deriving an unlock code for the optical article with a cryptographic module of a detoggler by applying a cryptographic algorithm to data provided by a point of sale (POS) machine operatively coupled to the optical article and to data input from an encrypted medium;
deriving a detoggling signal from the unlock code with a detoggler interface, wherein the detoggling signal comprises a set of values, wherein each value corresponds to a respective state of one of a plurality of marks disposed on a surface of the optical article, the plurality of marks comprising an optical-state change material in an initial state that prevents the optical article from being read by a player;
applying the detoggling signal to the plurality of marks via connectors of the detoggler, wherein applying the detoggling signal comprises setting the optical state-change material of a portion of the plurality of marks to a final state, based on the corresponding values of the detoggling signal, such that the optical article can be read by the player; and
removing a protective layer from the surface of the optical article, wherein the protective layer is initially disposed on the surface of the optical article to protect the optical state-change material of one or more of the plurality of marks from being set to a final state by an external stimulus,
wherein the optical article is rendered readable by the player when the protective layer is removed after applying the detoggling signal, and wherein the optical article is rendered unreadable by the player when the protective layer is removed before applying the detoggling signal.

2. The method of claim 1, wherein the initial state of the optical-state change material has an optical reflectivity of less than about 20 percent relative to the reflectivity of the final state of the optical-state change material.

3. The method of claim 1, wherein the optical-state change material in the initial state is transparent and the optical-state change material in the final state is opaque to a laser used by the player to read the optical article.

4. The method of claim 1, wherein the encrypted medium may be one or more of a store key, a clerk key table, data from a clerk badge, or an identifier from a packaging of the optical article.

5. The method of claim 1, wherein the cryptographic algorithm operates according to one of an advanced encryption standard (AES) or a public-key cryptography standard.

6. The method of claim 5, wherein the advanced encryption standard (AES) is operated in an electronic code book (ECB) mode.

7. The method of claim 1, comprising
changing a state of at least one of the plurality of marks such that a control logic of a set of control logic becomes accessible; to reveal instructions for the player not to play the optical article.

8. The method of claim 1, wherein the detoggling signal is derived as a function of an identifier on a packaging of the optical article.

9. The method of claim 8, wherein the identifier is stored in an electrical device on the packaging of the optical article.

10. The method of claim 8, wherein the identifier on the packaging of the optical article is one or more of a printed set of symbols, a magnetically readable strip, an optically readable bar code, or an RFID device.

11. The method of claim 1, wherein the unlock code is derived within a secure environment comprising a secure microprocessor, a Field Programmable Gate Array (FPGA), or a microcontroller enshrouded within a protective encapsulation.

12. The method of claim 1, wherein the optical-state change material is selected from the group consisting of an electrochromic material, a light-sensitive material, a thermally-responsive material, and a thermochromic material.

13. The method of claim 1, wherein said optical article comprises one of a CD, a DVD, a HD-DVD, a blu-ray disc, a near field optical storage disc, a holographic storage medium, a volumetric optical storage medium, an identification card, a passport, a payment card, a driving license, or a personal information card.

14. The method of claim 1, wherein the detoggling signal comprises an external stimulus comprising one or more of a laser, a thermal energy, infrared rays, X-rays, gamma rays, microwaves, visible light, ultra violet light, ultrasound waves, radio frequency waves, electrical energy, chemical energy, magnetic energy, or mechanical energy.

15. A system for activating an optical article comprising:
an optical article having a plurality of optical-state change marks disposed on a surface such that the optical article cannot be read by a player and having a protective layer disposed on the surface of the optical article configured to protect a portion of the plurality of optical state-change marks from being altered by an external stimulus; and
a detoggler comprising a processor configured to:
derive an unlock code for the optical article by performing cryptographic operations on data supplied by a point of sale (POS) machine operatively coupled to the optical article, and data input from an encrypted medium;
derive a detoggling signal from the unlock code, wherein the detoggling signal comprises a plurality of values, each value corresponding to a state of one of the plurality of optical state-change marks; and
apply the detoggling signal to alter a portion of the plurality of optical state-change marks such that the optical article can be read by the player,
wherein the optical article is configured to be rendered readable by the player when the protective layer is removed after applying the detoggling signal, and
wherein the optical article is configured to be rendered unreadable by the player when the protective layer is removed before applying the detoggling signal.

16. The system of claim 15, wherein the plurality of optical-state change marks initially have a reflectivity of less than about 20 percent compared to reflectivity of the portion of the plurality of optical state-change marks altered during the application of the detoggling signal.

17. The system of claim 15, wherein the plurality of optical-state change marks are initially transparent to a laser used by the player to read the optical article and the portion of the plurality of optical state-change marks altered by the application of the detoggling signal are opaque to the laser used by the player to read the optical article.

18. The system of claim 15, wherein the encrypted medium comprises one or more of a store key, a clerk key table, data from a clerk badge, or an identifier from a packaging of the optical article.

19. The system of claim 15, wherein the cryptographic operations are according to an advanced encryption standard (AES) or a public-key cryptography standard.

20. The system of claim 15, wherein the advanced encryption standard (AES) is operated in an electronic code book (ECB) mode.

21. The system of claim 15, wherein the optical article comprises:
control logic stored on one or more sectors of the optical article;
wherein each of the plurality of optical-state change marks is associated with a portion of the control logic;
wherein the control logic includes a command that instructs the player not to play the optical article; and
wherein only the portions of the control logic associated with a transparent optical-state change mark are executed by the player.

22. The system of claim 15, comprising a packaging for the optical article, wherein the packaging includes a package identifier and wherein the detoggling signal is computed as a function of the package identifier.

23. The system of claim 22, wherein the packaging comprises an electrical device and the package identifier is stored in the electrical device.

24. The system of claim 22, wherein the package identifier comprises one or more of a printed set of symbols, a magnetically readable strip, an optically readable bar code, or an RFID device.

25. The system of claim 15, wherein the unlock code is derived using a secure microprocessor, a Field Programmable Gate Array (FPGA), or a microcontroller enshrouded within a protective encapsulation.

26. The system of claim 15, wherein the optical-state change material is selected from the group consisting of an electrochromic material, a light-sensitive material, a thermally-responsive material, and a thermochromic material.

27. The system of claim 15, wherein said optical article comprises one of a CD, a DVD, a HD-DVD, a blu-ray disc, a near field optical storage disc, a holographic storage medium, another like volumetric optical storage medium, an identification card, a passport, a payment card, a driving license, or a personal information card.

* * * * *